United States Patent [19]

Yarbrough et al.

[11] Patent Number: 5,661,265
[45] Date of Patent: Aug. 26, 1997

[54] DRAIN FOR ELECTRICAL ENCLOSURE

[75] Inventors: Garrett S. Yarbrough, Chicago; Nabil L. Mina, Roselle, both of Ill.

[73] Assignee: Appleton Electric Company, Chicago, Ill.

[21] Appl. No.: 570,316

[22] Filed: Dec. 11, 1995

[51] Int. Cl.⁶ .................................................. H02G 3/08
[52] U.S. Cl. ...................... 174/50; 210/266; 220/371; 405/52; 405/303
[58] Field of Search ................... 174/50, 48, 49; 52/169.5, 302.7, 302.1, 209, 204.52; 405/50, 52, 303; 220/371, 372; 210/266, 282, 283

[56] References Cited

U.S. PATENT DOCUMENTS

| | | | |
|---|---|---|---|
| 1,007,828 | 11/1911 | Webb | 220/426 |
| 1,011,395 | 12/1911 | Ziller | 220/88.3 |
| 2,402,840 | 6/1946 | Olley | 174/50 |
| 2,405,927 | 8/1946 | Tomblom | 138/42 |
| 2,675,886 | 4/1954 | McMullen | 220/371 X |
| 3,356,255 | 12/1967 | Zavertnik et al. | 220/88 |
| 3,585,082 | 6/1971 | Siller | 220/371 X |
| 3,767,050 | 10/1973 | Reiner | 210/266 X |
| 4,175,671 | 11/1979 | Holl et al. | 220/371 X |
| 4,216,349 | 8/1980 | Wium | 174/50 |
| 4,467,136 | 8/1984 | Wium | 174/50 |
| 5,449,453 | 9/1995 | Tang | 210/266 X |

OTHER PUBLICATIONS

Appleton Electric Co. Master Catalog 005–Rev. 2 ECDB Drain Breather, 1995.
Killark Catalog #3500 R, KBID Drain (Group B), 1991.

*Primary Examiner*—Kristine L. Kincaid
*Assistant Examiner*—Dean A. Reichard
*Attorney, Agent, or Firm*—Jones, Day, Reavis & Pogue

[57] ABSTRACT

An explosion proof drain for incorporation into an enclosed electrical system including a hollow housing with an opening at an upper end and an annular flange circumscribing a smaller opening at a lower end. A porous, metallic disk is force fitted into a bore in the housing and seated against the annular flange. A filling material is poured into the bore of the housing and is supported by the porous metallic disk. A second porous, metallic disk is force fitted into the opening in the upper end of the drain to ensure that the sand does not exit the drain.

9 Claims, 1 Drawing Sheet

DRAIN FOR ELECTRICAL ENCLOSURE

BACKGROUND OF THE INVENTION

1. Field of Invention

This invention relates to a drain for an enclosed electrical system for allowing fluid to exit but not enter the system. The drain also retards the propagation of a flame to render the drain explosion proof.

2. Description of Related Art

Drains for enclosed electrical systems typically comprise a thinly walled cylindrical housing with a bore therein which extends between an upper end and a lower end. The upper end of the drain has external screw threads which mate with internal screw threads of an electrical enclosure to facilitate incorporation of the drain into the enclosed electrical system. Upon incorporation, an opening in the upper end provides communication between the enclosed electrical system and the bore of the drain. The lower end has an opening which provides communication between the bore of the drain and the ambient atmosphere. The drain serves to provide an exit for water or other fluids which can accumulate in an electrical system. If not removed, the water can cause corrosion and gradual deterioration of the electrical components.

While the drain serves as means for water to exit the system, it must also be explosion proof. Otherwise an explosion generated in a facility at one end of the electrical system may propagate via the interconnected components of the electrical system to another location in the facility. Industrial standards dictate that equipment used in enclosed electrical systems be designed to prevent flame propagation.

The drain must also prevent water from entering the enclosed electrical system through the bore or the purpose of the drain would be defeated. If water does somehow enter the system, the drain must allow water to exit the system. Hence, the drain must have three properties, which are not easily attainable in combination: the prevention of water from entering the system, the provision of an outlet for collected water in the system and the prevention of flame propagation.

Prior art devices have proved reasonably satisfactory. One such prior art device made by Appleton Electric Company, the ECDB Series drain, is a drain with internal screw threads in the interior wall of the bore. A drain plug with complementary external screw threads is threaded into a loose engagement with the internal screw threads of the drain.

The clearance between the internal screw threads of the drain and the external screw threads of the plug must be sufficiently great to allow passage of water but sufficiently narrow to prevent the propagation of a flame. Underwriters Laboratories mandates that the clearance between a metal plug and the inner wall of the metal drain be no more than 2 milliinches. Accordingly, accurate machining of the plug and the drain with sufficiently small clearance is necessary to manufacture such a drain. Moreover, such a drain allows moisture to exit the drain at a very low volumetric flow rate.

Another prior art drain known as Killark drain type KB1.16870AAA comprises a drain with no internal screw threads but with an annular flange surrounding the opening in the lower end of the drain so the opening in the lower end has a smaller diameter than the inner diameter of the bore in the drain. A porous cylindrical metal insert is inserted into the bore of the drain. The insert is porous enough to allow water to exit out of the drain but provides a sufficient barrier to retard the propagation of a flame. This prior art drain also includes a radial hole at the lower end of the drain for additional drainage.

The Killark prior art drain also exhibits low water volumetric flow rates and requires accurate machining to ensure the clearance between the insert and the inner wall of the bore is not greater than 2 milliinches. Moreover, for this drain to sufficiently retard the propagation of a flame, it must be made longer. The additional material to make the drain longer requires more expense than a shorter drain.

SUMMARY OF THE INVENTION

The present invention overcomes the disadvantages of the previous drains for enclosed electrical systems. Therefore, an object of the invention is to provide a drain for an enclosed electrical system which permits sufficient water volumetric flow for exiting the enclosed electrical system, prevents water from entering the system and prevents the propagation of a flame.

Another object of the present invention is to provide a drain which is inexpensive to manufacture because it requires a relatively smaller amount of material and does not require accurate machining of the interior of the drain.

The foregoing advantages are achieved by the drain of the present invention which comprises a thinly walled housing with a bore therein extending between an upper end and a lower end. The upper end has external screw threads for mating with complementary internal screw threads in an opening in a component of the enclosed electrical system. An upper opening in the upper end and a lower opening in the lower end of the drain both communicate with the bore through the housing. The upper opening has the same diameter as the inner diameter of the bore. The lower end includes an annular flange which circumscribes a lower opening in the lower end with a diameter smaller than the inner diameter of the bore. Upon screwing the upper end into engagement with the internal screw threads of the opening in the electrical enclosure, the electrical enclosure is in communication with the bore in the drain via the upper opening in the upper end, and the bore is also in communication with the atmosphere via the lower opening in the lower end.

The drain also has an outer torquing section comprising, for example, six equilateral surfaces. The torquing section can be gripped by a torquing tool such as a wrench to tighten the engagement between the external screw threads of the upper end and the internal screw threads in the opening in the electrical enclosure.

A porous, metallic disk is force fitted into the bore of the drain and pressed into a seated engagement with the annular flange at the lower end of the housing. The annular flange prevents the disk from exiting the drain. The area in the bore defined by the inner wall of the housing and the lower disk is filled with a filling material which is preferably sand. A porous, metallic disk is force fitted into the upper opening of the upper end to prevent any of the sand from leaving the bore of the drain. The metallic disks and the sand allow water to permeate the drain and exit the enclosed electrical system but prevent a flame from propagating through the drain and water from entering the enclosed electrical system through the drain.

Other objects, features and advantages of the present invention will become apparent from the following detailed description of the preferred embodiment of the invention when taken in conjunction with the drawings and the appended claims.

BRIEF DESCRIPTION OF THE DRAWINGS

The drawings which are part of the disclosure illustrate the present invention.

DETAILED DESCRIPTION OF THE INVENTION

Figure 1:
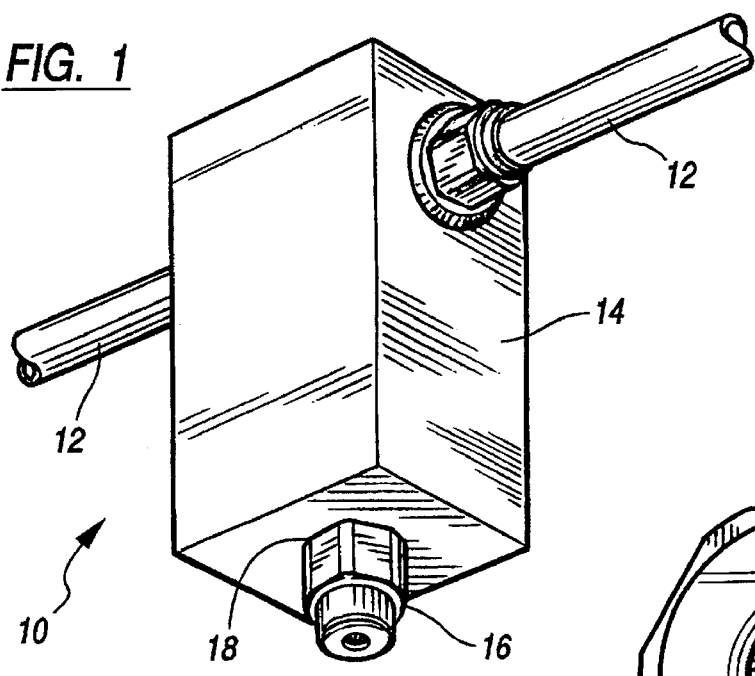
FIG. 1 is a perspective view of the drain of the present invention incorporated into an enclosed electrical system.
Figure 4:
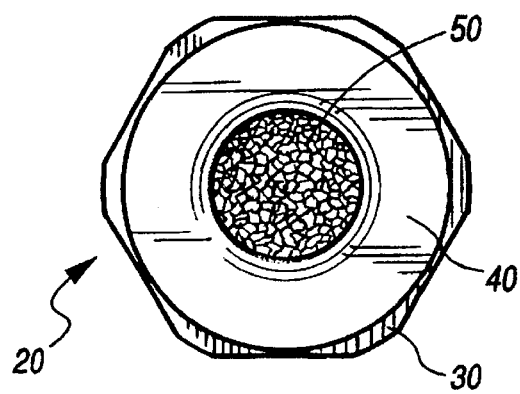
FIG. 4 is a front elevational view of the drain of the present invention.

FIG. 1 illustrates a portion of an enclosed electrical system 10 with conduits 12 entering and exiting a switch box 14. The drain 16 of the present invention is installed into an opening 18 in the switch box 14. The opening 18 in the enclosed electrical system 10 is on the downward side of the switch box 14, so that water or any other undesirable fluid is drawn out of the system 10 through the attached drain 16 by the force of gravity. Unless means to retard an explosion is used, an explosion generated at one end of the conduit 12 would propagate unrestrained to the switch box 14. A drain 16 without explosion retarding means would provide a portal for the flame front of the explosion to escape the enclosed electrical system 10. Therefore, not only must the drain 16 facilitate the effluence of water from the enclosed electrical system 10, but it must also retard propagation of a flame. Moreover, the drain 16 must prevent water from entering into the enclosed electrical system 10 which would otherwise defeat the purpose of the drain 16.

Figure 2:
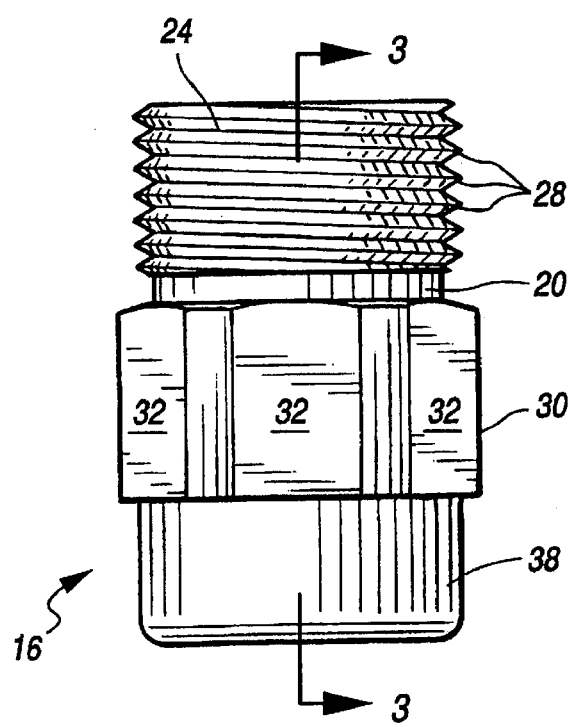
FIG. 2 is an elevational view of the drain of the present invention.

The drain 16 of the present invention is best shown in FIG. 2. The drain is made of a corrosion-resistant material. A metal such as stainless steel or a thermoplastic such as RYTON R-7® available from Phillips Petroleum Company may be suitable. The preferred drain 16 is constructed of aluminum.

Figure 3:
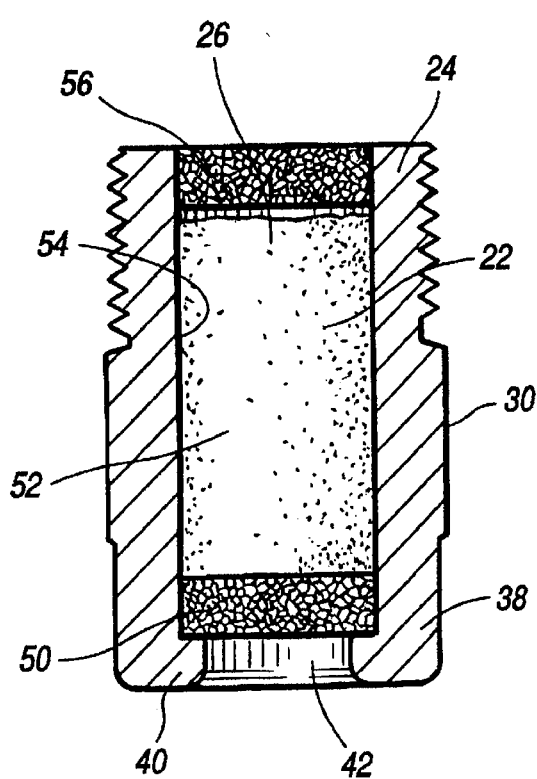
FIG. 3 is a cross sectional view taken along line 3—3 of FIG. 2.

The drain 16 comprises a generally cylindrical housing 20 with an interior bore 22 therethrough as shown in FIG. 3. An upper end 24 of the housing 20 has an axial upper opening 26 therein which provides access to the interior bore 22. The upper end 24 also has external screw threads 28 therearound for mating with complementary interior screw threads in the opening 18 in an enclosed electrical system 10. The upper end 24 has sufficient screw threads 28 to render the housing 20 explosion-proof.

As shown in FIG. 2, the drain has a central torquing section 30 which comprises several working surfaces 32. The working surfaces 32 can be engaged by a torquing tool such as a wrench to firmly tighten the drain 16 into the opening of the enclosed electrical system 10. In the preferred embodiment, the drain 16 has six equilateral working surfaces 32 comprising the torquing section 30.

A lower end 38 of the housing 20 includes an interior annular flange 40 which circumscribes a lower axial opening 42. The lower opening 42 in the lower end 38 is concentric with the interior bore 22. However, the lower opening 42 has an inner diameter which is smaller than an inner diameter of the interior bore 22. Whereas, the upper opening 26 in the upper end 24 has an inner diameter which is conterminous with the interior bore.

The upper opening 26 in the upper end 24 of the drain 16 provides communication between the enclosed electrical system 10 and the interior bore 22 of the drain 16 upon threading the external screw threads 28 in the upper end 24 with internal screw threads (not shown) in the opening 18 in the enclosed electrical system 10. The smaller, lower opening 42 in the lower end 38 provides for communication between the interior bore 22 and the atmosphere.

A porous, metallic disk 50 is force fitted into the interior bore 22 of the drain 16 and seated on the annular flange 40 at the lower end 38 of the drain 16. The lower disk 50 is made of pressed powdered steel. The preferred metallic disk is 0.125 inches in height and can be obtained from Mott Metallurgical Corporation in Farmington, Conn. under the trade name MOTT 100 MICRON. The annular flange in the lower end of the drain prevents the disk from falling out of the drain. Water which drains to the lower end 38 of the drain 16 is able to pass through the porous, metallic disk 50 and exit out the lower opening 42 in the lower end 38 of the drain 16.

Filling material 52 comprising a plurality of small objects occupies the space defined by an inner wall 54 of the interior bore 22 and the lower disk 50. An upper disk 56 with the same construction as the lower disk 50 is force fitted into the interior bore 22 in the opening in the upper end 24 of the housing 20. Thus, the disks 50, 56 prevent the filling material 52 from exiting the drain 16. The entire volume constrained by lower disk 50, the inner wall 54 of the interior bore 22 and the upper disk 56 is occupied by the filling material 52. Both the upper metallic disk 56 and the lower metallic disk 50 have outer diameters which are the same as the inner diameter of the interior bore 22 after being force fitted into the interior bore 22 through the housing 20.

This construction allows water to drain through the upper opening 26, through the upper disk 56, through the filling material 52, through the lower disk 50 and out the lower opening 42 in the lower end 38 of the drain 16, so water can easily exit the system 10. Moreover, the configuration of upper metal disk 56, the filling material 52 and the lower metal disk 50 prevents flame from passing through the drain 16 and out of the enclosed electrical system 10 and prevents fluid from entering into the enclosed electrical system 10 through the drain 16.

Suitable filling material includes ceramic beads, glass beads, steel balls, steel pellets and sand. Sand is the most preferred filling material. The preferred grain size of the filling material is 0.066 to 0.094 inches.

The outer diameter of the housing is preferably 0.84 inches and the inner diameter of the interior bore and the opening in the upper end of the housing is preferably 0.5 inches. The diameter of the opening in the lower end of the drain is preferably 0.375 inches. The depth of the annular flange is 0.1145 inches. The volume of the space occupied by the filling material is 0.198 cubic inches. The overall length of the drain is preferably 1.375 inches which is an eighth of an inch shorter than the prior art drain which utilizes the porous metallic insert.

To assemble the drain 16 of the present invention, the lower disk 50 is force fitted through the interior bore 22 in the housing 20 and seated against the annular flange 40 at the lower end 38. Filling material 52 is loaded into the drain 16 in the space defined by the lower disk 50 and the inner wall 54 of the interior bore 22. Subsequently, the upper disk 56 is force fitted at the upper end 24 of the housing 20 to seal the filling material 52 within the drain 16. The external screw threads 28 in the upper end 24 of the drain 16 are then engaged with the complementary internal screw threads in the opening 18 in the switch box 14 of the enclosed electrical system 10. The drain 16 is then tightly screwed into the opening 18 in the switch box 14 in the enclosed electrical system 10 and tightened perhaps by use of a torquing tool via the torquing section 30 of the drain 16.

The present invention has many advantages. Because the porous, metallic disks 50, 56 are force fitted into the interior bore 22 of the drain 16, there is no need to machine the disks 50, 56 or the interior bore 22 accurately. Because the filling material 52 and the disks 50, 56 abut against the inner wall 54 of the bore 22, no issue regarding clearance is presented. The filling material 52 is so effective, that the drain 16 can be made shorter than prior art drains with the same effectiveness in retarding the propagation of flame. Moreover, the drain 16 can be made of several materials including aluminum and thermoplastic. Additionally, the filling material 52 is inexpensive. Certain beach sands can be used to fill the interior bore 22 of the drain 16.

EXAMPLES

Example 1

Two prior art drains and the drain of the present invention were subjected to water volumetric flow rate testing. An Appleton drain from the ECDB Series which employs a loosely externally-threaded insert in the bore of the drain was subjected to three test runs. The average volumetric flow rate for the Appleton ECDB series drain was 40.78 ml/min.

The Killark drain type KB1.16870AAA which employs the porous metallic insert in the bore of the drain was subjected to seven test runs. The average volumetric flow rate for the Killark drain was 93.72 ml/min.

The drain of the present invention was also subjected to volumetric flow rate testing. The drain was packed with sand to occupy the entire volume of the bore which was calculated to be 0.198 cubic inches. By counting the grains of sand in the bore, and factoring in that the grain size of the sand ranged from 0.066 to 0.094 inches in diameter, the volume of the sand used in the drain was estimated to range from 0.04 to 0.12 cubic inches. The drain filled with sand was subjected to six test runs yielding an average volumetric flow rate of 412.33 ml/min.

Example 2

A study was conducted to determine whether sand as a filling material has acceptable flame retardant properties in the present invention. The drain of Example 1 filled with sand was tested according to the UL-886 flame propagation test requirements in a Group B hazardous location. The drain was screwed into an enclosure in communication with an explosion source via a 1.5 inch conduit. The enclosure was subjected to explosions originating five, ten and fifteen feet down the conduit.

During the testing, no flame propagation outside of the drain was observed. Because no flame propagation was observed during testing, sand was deemed an acceptable filling material. Because sand is inexpensive, it was deemed the preferred filling material.

Example 3

The drain subjected to the explosion test in Example 2 was subjected to flow rate testing, both before and after the explosion test. The average flow rate before the explosion test was 412 ml/min. The average flow rate after the explosion test was 314 ml/min. Even the post-explosion average flow rate far exceeded the water draining capability of the prior art drains on the market. Moreover, the depth of the annular flange of the same drain was measured before the explosion test and after the explosion test. The depth of the annular flange remained unchanged.

Example 4

A study was conducted to determine how well the drain of the present invention resists the entry of water into the enclosed electrical system by subjecting it to a NEMA-4 hose test. In the test, the drain was screwed into a water-tight enclosure 10 feet away from an Elkhart hose test apparatus nozzle. The water flow rate was adjusted to 65 gal./min. and sprayed up through the bottom of the drain for five minutes. After the test, the water-tight enclosure was opened and inspected. Because no evidence of moisture was found in the enclosure, it was concluded that the drain of the present invention is compliant with the NEMA-4 hose test requirements.

It will be appreciated that the detailed description and the examples relate to the preferred embodiment by way of example only. Many variations of the invention will be obvious to those knowledgeable in the field, and such obvious variations are within the scope of the invention as described and claimed, whether or not expressly described.

What is claimed is:

1. A drain for draining fluid from an electrical system comprising a housing having a bore therein with a first end for insertion into said electrical system, said first end having a first opening therein for communicating the bore of said housing with said electrical system and a second end with a second opening therein for communicating the bore of said housing with an ambient atmosphere surrounding said electrical system, first barrier means secured in the bore of said housing at said first end and configured for controlled flow of fluid therethrough, second barrier means secured in the bore of said housing at said second end and spaced apart from said first barrier means, said second barrier means being configured for controlled flow of fluid therethrough, and a plurality of small particulate objects interposed between said first barrier means and said second barrier means and substantially filling said bore.

2. The drain of claim 1 wherein said second end has an annular flange which circumscribes said second opening, so said second opening is more narrow than said bore, said annular flange acting as a seat for said second barrier means.

3. The drain of claim 1 wherein said plurality of small objects comprises a plurality of grains of sand.

4. The drain of claim 1 wherein at least one of said first barrier means and said second barrier means is a porous metal disk.

5. The drain of claim 4 wherein said porous, metal disk is press fit into said bore.

6. The drain of claim 4 wherein said porous metal disk is as wide as said bore after said disk is secured in said bore.

7. The drain of claim 1 wherein said first end has external screw threads for screwing into engagement with complementary internal screw threads in an opening in said electrical system.

8. The drain of claim 7 wherein said housing includes a torquing section for engagement by a torquing tool to facilitate screwing.

9. The drain of claim 1 wherein said first opening is substantially the same width as said bore.

* * * * *